Figure 3:
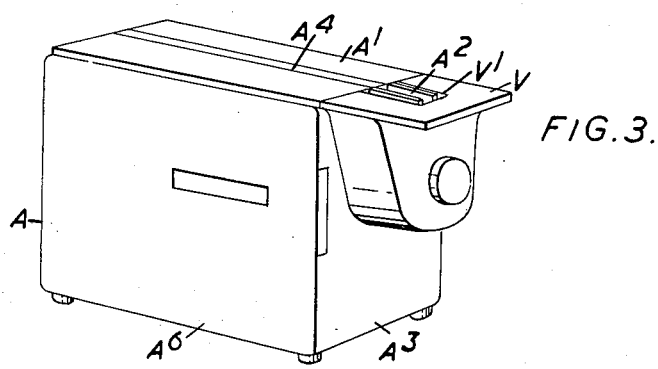

March 20, 1962 R. E. REASON 3,025,700
SURFACE TESTING APPARATUS
Filed July 14, 1958 4 Sheets-Sheet 1
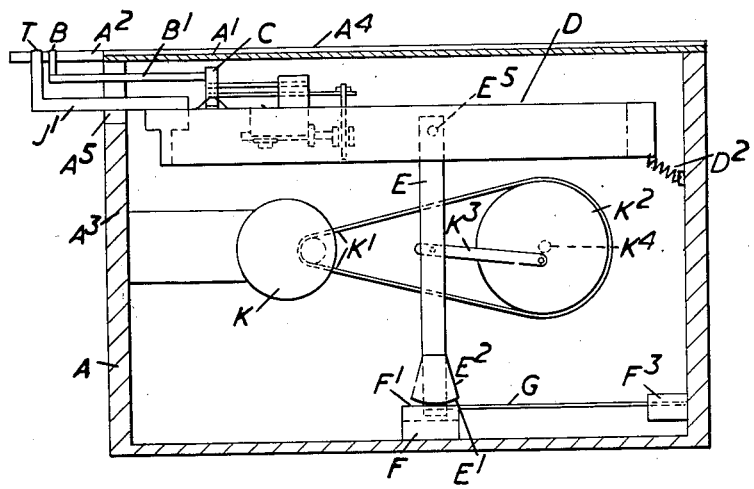
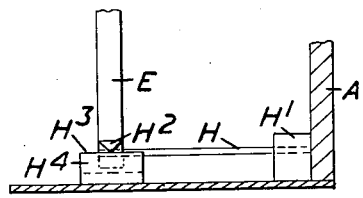
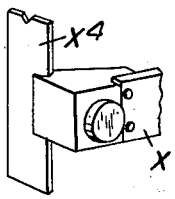
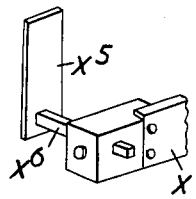
Inventor
RICHARD E. REASON
By
Holcombe, Wetherill & Brisebois
Attorney Inventor
RICHARD E. REASON March 20, 1962  R. E. REASON  3,025,700
SURFACE TESTING APPARATUS
Filed July 14, 1958  4 Sheets-Sheet 3

Inventor
RICHARD E. REASON
By
Holcombe, Wetherill + Brisebois
Attorney

March 20, 1962 R. E. REASON 3,025,700
SURFACE TESTING APPARATUS
Filed July 14, 1958 4 Sheets-Sheet 4

Inventor
RICHARD E. REASON
By
Holcombe, Wetherill & Brisebois
Attorney

United States Patent Office 3,025,700
Patented Mar. 20, 1962

3,025,700
SURFACE TESTING APPARATUS
Richard Edmund Reason, Leicester, England, assignor to Taylor, Taylor & Hobson Limited, Leicester, England, a company of Great Britain
Filed July 14, 1958, Ser. No. 748,485
Claims priority, application Great Britain July 18, 1957
7 Claims. (Cl. 73—105)

This invention relates to apparatus for measuring or indicating the roughnesses or undulations of a surface, and has for its object to provide improved apparatus which the surfaces of a variety of work-pieces of widely different shapes can be investigated.

Apparatus for measuring or indicating the roughnesses or undulations of the surface of a work-piece, according to the present invention, comprises a casing from which extends an outwardly projecting work support, a stylus carried by a stylus supporting arm projecting through the wall of the casing, means within the casing for urging the stylus into engagement with the test surface of the work-piece, means within the casing for traversing the stylus over the test surface, and detecting means within the casing responsive to the working movements of the stylus approximately normal to the test surface during the traversing movement for operating a measuring or indicating instrument.

The outwardly projecting work support preferably comprises an elongated slotted extension of a plate-like member carried by or forming part of the casing whereby in use the stylus is urged through the slot in such projection into engagement with the test surface and is traversed along such slot over the test surface. The plate-like member may itself be grooved or slotted in continuation of the slot in the outwardly projecting work support to afford an additional receiving surface for supporting a work-piece. Conveniently, the casing may carry a guide member having a V-notch opening towards the projecting work support, such guide member being adjustably movable towards or away from the work support so that an annular or tubular work-piece positioned with its inner surface on the work support can be supported by bringing the V-notch into engagement with its exterior curved surface.

Conveniently, the casing may carry a fence extending parallel to the direction of traversing for accurately locating a work-piece on the work support, such fence being adjustably movable in a direction at right angles to the direction of traversing.

Preferably, the stylus supporting arm is pivotally mounted within the casing on a pick-up head to which the traversing drive is applied, and is biased relatively to the pick-up head to hold the stylus in engagement with the test surface, the detecting means being responsive to relative movements between the stylus and the pick-up head in a direction approximately normal to the direction of traversing. In order to provide a reference datum for the working movements of the stylus, a portion of the pick-up head preferably projects through the wall of the casing and carries a rounded skid, the pick-up head being pivoted within the casing to a member (for example a slider mounted on a pivoted arm) through which the traversing drive is applied and being biased to urge the rounded skid into engagement with the test surface.

While it may sometimes be desirable to traverse the pick-up head in an arcuate path, the pick-up head is preferably traversed by suitable means within the casing along a predetermined straight path.

The movement of the pick-up head along such straight path may be brought about in a number of ways. In one arrangement, the means for traversing the stylus comprises a member carrying a rounded bearing surface which is urged towards a guide or guides determining a guide plane parallel to the desired straight path movement of the pick-up head, such pick-up head being effectively pivoted to the bearing member at a distance from the guide plane equal or approximately equal to the radius of curvature of the rounded bearing surface, and means for moving the bearing member so that it is caused to roll along the guide plane in the desired direction of movement of the pick-up head. In another arrangement, such traversing means comprises a long arm effectively pivoted at one end to the pick-up head and having a fixed pivot at the other end, and means for moving the long arm so that it rotates about its fixed pivot in a plane containing the desired direction of movement of the pick-up head, whereby the movement of the pick-up head associated with a small rotation of the long arm approximates to movement along a straight path. Either of such two arrangements may be used whether or not the reference datum for the stylus is afforded by a skid carried on the stylus supporting arm.

An electrical transducer will usually provide the most convenient form of detecting means, and such transducer may be coupled with the stylus supporting arm in various ways. The arrangement claimed and described in the present applicant's United States of America patent application Serial No. 742,415, now Patent No. 2,972,250, may be used with advantage. In this arrangement, at least one of two normally operative connections respectively between the stylus supporting arm and a detector device constituting the detecting means and between such detector device and the pick-up head preferably includes a yieldable or breakable coupling for rendering the detector device unresponsive to the working movements of the stylus, and clamping means is provided which can be operated to make the yieldable or breakable coupling operative and thereby render the detector device responsive to the working movements of the stylus during the traversing movement. Thus, the yieldable or breakable coupling may include a member which when the coupling is unclamped is free to move about a pivot axis parallel to the test surface, and the clamping means comprises a pair of jaws which when operated exert a gripping force on such member in a direction parallel to such pivot axis. The clamping means is preferably electromagnetically operated and, in this case, the two clamping jaws and the member gripped between them are preferably made of magnetisable material and form part of a magnetic circuit linked with an operating coil or coils whereby energisation of such coil or coils will cause the two jaws to move into gripping engagement with the member. In one arrangement, the operative connection between the stylus and the detector device consists of a stylus support rigidly connected to the detector device, the unit comprising the detector device and the stylus support and stylus being pivotally connected to the pick-up head about an axis approximately parallel to the test surface whereby the yieldable coupling, when not clamped, permits such unit to move relatively to the pick-up head about such pivot axis. The detector device preferably consists of a piezo-electric crystal.

Figure 4:
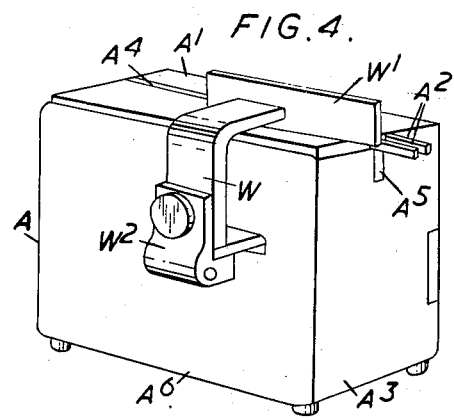
Figure 8:
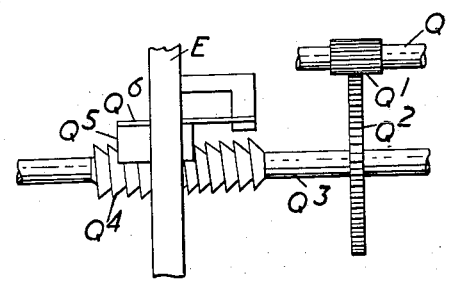
Figure 9:
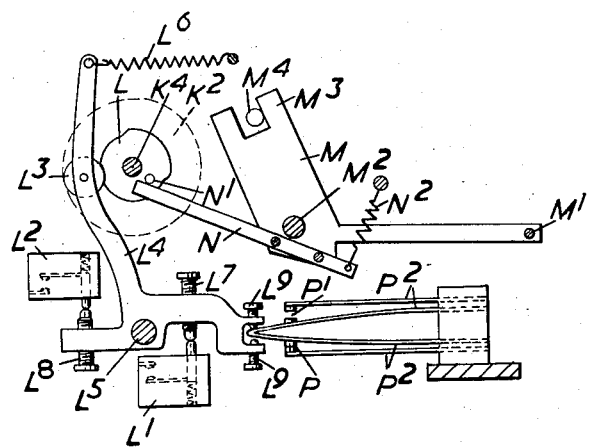
Figure 10:
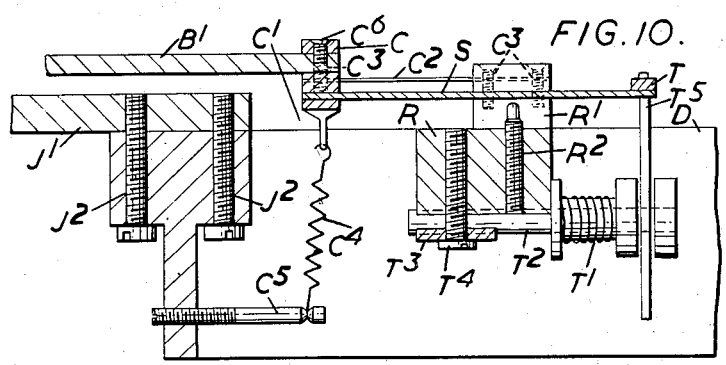
Figure 11:
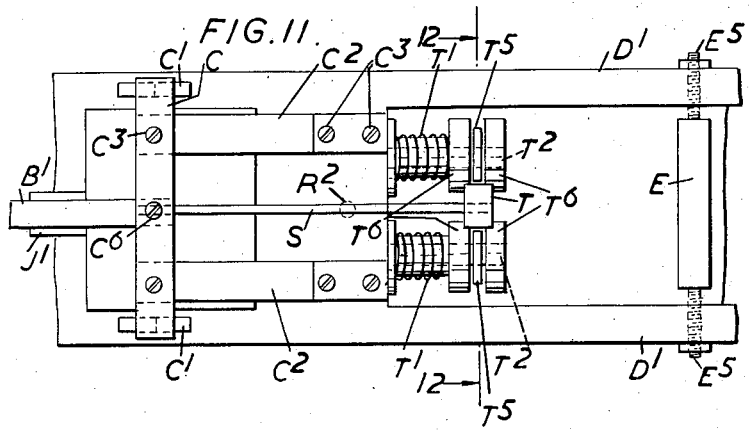
Figure 12:
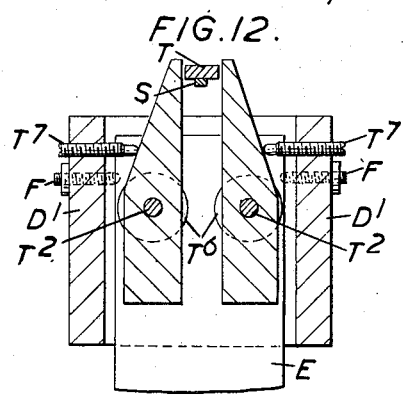

The invention may be carried into practice in various ways, but a preferred arrangement of measuring or indicating apparatus according thereto will now be described with reference to the accompanying drawings, in which FIGURE 1 is a diagrammatic view of the preferred arrangement in side elevation, FIGURE 2 shows a modified form of mounting for one end of the driving arm, FIGURE 3 shows the casing of the preferred arrangement with an auxiliary work-table detachably fitted thereon, FIGURES 4 and 5 respectively show the casing with alternative fittings mounted thereon for assisting in the location of a work-piece on the projecting work support, FIGURES 6 and 7 show two further alternative fittings for the casing, FIGURE 8 shows an alternative form of drive for the driving arm, FIGURE 9 shows a switch mechanism operable by the drive to the driving arm illustrated in FIGURE 1, and viewed from the direction opposite to that of FIGURE 1, FIGURE 10 is an enlarged view in vertical section of the pick-up unit shown in FIGURE 1, FIGURE 11 is a plan view of the pick-up unit shown in FIGURE 10, and FIGURE 12 is a sectional view of the pick-up unit on the line 12—12 of FIGURE 11.

In this arrangement, the main parts of the apparatus are carried in a box-like casing A (see FIGURE 1) whose upper wall carries a top plate $A^1$ of hardened metal which has an integral slotted nose-piece $A^2$ projecting from the centre of one of its edges so that such slotted nose-piece $A^2$ extends outwardly from above one side wall $A^3$ of the casing A. Conveniently, a groove $A^4$ is provided in the top plate $A^1$ continuous with the slot in the nose-piece $A^2$, for a purpose to be later described. A stylus B having a sharp tip of very small radius (for example 0.0002 of an inch) projects upwardly through the slot in the nose-piece $A^2$ from a supporting arm $B^1$ so that the tip of the stylus B is approximately level with the top surface of the nose-piece $A^2$. The stylus supporting arm $B^1$ extends from below the stylus B approximately horizontally through a hole $A^5$ in the side wall $A^3$ of the casing A and is pivoted at an intermediate point in its length to a hollow pick-up head D extending generally parallel to the top plate $A^1$ within the casing A. The pick-up head D is pivotally connected at an intermediate point to one end of a driving arm E which at its other end carries a rounded bearing surface $E^1$ maintained in rolling engagement with a plane guide surface $F^1$ carried on an upward projection F from the base of the casing A. The stylus arm $B^1$ extends lengthwise parallel to the pick-up head D with its pivotal connection thereto having an axis transverse to its length. Conveniently, as is more clearly shown in FIGURE 10, the pivotal connection between the pick-up head D and the driving arm E comprises a pair of inwardly directed pointed screw plugs $E^5$ projecting through the side walls $D^1$ of the pick-up head D, such pointed projections $E^5$ gripping between them the driving arm E so as to define a pivotal axis at right angles to the length of the pick-up head D. The other end of the driving arm E is secured to one end of a spring ligament G which extends lengthwise in the plane of the guide surface $F^1$ on which the bearing surface $E^1$ on the arm E is to roll and which at the other end is firmly secured in the plane of such guide surface. Preferably, as indicated in FIGURE 1, the rounded bearing surface $E^1$ is defined by the rounded lower edges of two plates $E^2$ carried by the lower end of the driving arm E on opposite sides thereof. The upward projection F carrying the plane guide surface $F^1$ is recessed between the planes of the two plates $E^2$ to receive the lower end proper of the driving arm E, one end of the ligament G being secured to such lower end in the plane of the guide surface $F^1$. The ligament G is of such size and dimensions that, while it is substantially rigid in or approximately in the guide plane, and thus substantially prevents sliding movement between the rounded end face $E^1$ and the guide surface $F^1$, it is sufficiently flexible in a direction at right angles to the guide plane readily to permit rotational movement of the driving arm E about the axis of curvature of its rounded bearing surface $E^1$. The bearing surface $E^1$ is cylindrically curved about the axis of the pivotal connection of the pick-up head to the driving arm, such axis being defined by the pointed projections $E^5$ as above mentioned, so that when such rolling occurs, such pivotal connection will move in a straight line path parallel to the guide surface $F^1$.

If desired, instead of using a cylindrical bearing surface at the end of the driving arm E remote from the pick-up head D, a knife edge and ligament hinge connection may be employed. In the arrangement shown in FIGURE 2, a spring ligament H is connected between the lower end of the driving arm E and an upward projection $H^1$ from the base of the casing A so that such ligament H effectively constitutes a hinge on which the driving arm E can pivot. The driving arm is independently supported on the base of the casing by means of a pair of knife edges $H^2$ carried by the lower end of the driving arm E on opposite sides thereof, such knife edges $H^2$ engaging with a pair of contact faces carried on an upward projection $H^4$ from the base of the casing A. It will be clear that with this construction the pivotal connection of the pick-up head D to the driving arm E will move in an arcuate path, the degree of approximation to a straight line path depending on the length of the driving arm E.

The pick-up head D carries an arm $J^1$ extending lengthwise parallel to the length of the pick-up head D beneath the stylus supporting arm $B^1$ and on which is mounted a skid J of relatively large radius (for example an inch) compared with that of the stylus B, the arm $J^1$ extending through the hole $A^5$ in the casing wall $A^3$ below the slotted projection $A^2$ so that the skid J extends upwardly through the slot in the nose-piece $A^2$ adjacent to the stylus B. The pick-up head D is balanced about the upper end of the driving arm E and a spring $D^2$ anchored to the casing A acts on the pick-up head D to cause the skid J to be urged upwardly to bear against the surface to be tested when the work-piece carrying such surface is placed on the slotted projection $A^2$, which thus constitutes a support for the work-piece. As shown in FIGURE 3, when it is desired to test the nominally flat surface of a body, an auxiliary supporting table V having a slot $V^1$ for accommodating the nose-piece $A^2$ may be secured to the casing A so as to constitute an extension of the hardened top plate $A^1$. The body is then placed with its flat test surface on the extension table V over the slotted nose-piece $A^2$ ready for testing. It should be mentioned that in FIGURE 3, as also in FIGURES 4 and 5, subsequently to be described, the stylus B and the skid J and also their respective supporting arms $B^1$ and $J^1$, have been omitted for clarity. Carried on a U-shaped bracket W (see FIGURE 4) mounted on a second side wall $A^6$ of the casing A is a plate-like member $W^1$ extending parallel to the slot in the nose-piece $A^2$ in a vertical plane and constituting a fence against which the body to be tested can be placed in order to locate it accurately in the desired position. The U-shaped bracket W, which protrudes from the wall $A^6$ of the casing A and then extends upwardly and then horizontally again over the hardened top plate $A^1$, can be moved inwardly and outwardly from the side wall $A^6$ of the casing A, thus adjusting the distance of the fence $W^1$ from the nose-piece $A^2$. The movement of the bracket W in and out of the casing may either be frictionally controlled or be controlled by means of a lock and release clamp. Preferably, the U-shaped bracket is formed in two parts, the upper part carrying the fence $W^1$ being detachably secured to the lower part $W^2$ so that any one of a number of differently sized fences can readily be secured in position. Although not shown, means may be provided, if desired, for adjusting the orientation of the fence $W^1$ about a horizontal axis. Thus, when it is required to test a line on the surface of a cylindrical body parallel to the axis of the body, such body may be placed on the work table $A^1$ and slightly biassed to roll against the fence. The distance of the fence $W^1$ from the nose-piece $A^2$ is adjusted so that with the cylindrical body resting against it the desired test line on the body is above the slot in the nose-piece $A^2$. In order to test a cylindrical body of small diameter, such body may be located accurately on the nose-piece $A^2$ by placing it in the groove $A^4$ of the hardened top plate $A^1$. Whether or not as shown in the drawings the slot extends to the free end of the nose-piece $A^2$, the groove $A^4$ may continue to such free end so that a long thin cylindrical body can readily be placed in position. In order to assist in the location of annular and tubular bodies, the casing is provided with a bar X adjustably slidable parallel to the direction of traverse through the wall $A^3$ of the casing A through which the stylus arm $B^1$ extends.

Figure 5:
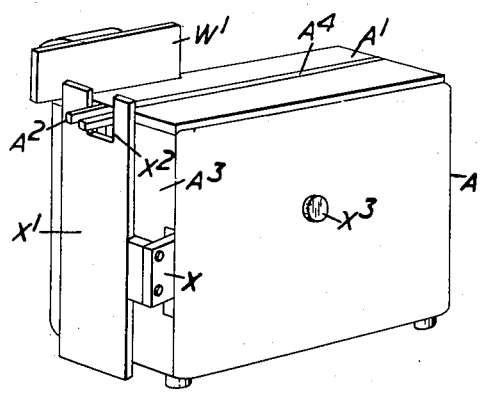

As shown in FIGURE 5, for assisting in the location of rings, the bar X may carry a back-plate $X^1$, mounted square to the direction of traverse and slotted at $X^2$ to clear the nose-piece $A^2$, against the exposed surface of which can be pressed a ring resting on the nose-piece $A^2$, the ring being located laterally, if necessary, by the above-described fence $W^1$, which if desired may have upwardly and downwardly extending portions for this purpose. A knob $X^3$ on the casing A for driving the bar X through a rack and pinion coupling is also shown in FIGURE 5.

Alternatively, in FIGURE 6 is shown a vertically adjustable V-support $X^4$ carried by the outer end of the bar X for engaging the lower surface of a tube of which the inner wall to be tested is resting on the nose-piece $A^2$. Both the adjustable fence $W^1$ and the adjustable guide plates $X^1$ or $X^4$ can be completely detached from the casing A, when desired. For steadying small rings, which can be suspended on the nose-piece without need for the guide plate, a laterally adjustable stop may be provided. For example, as shown in FIGURE 7, such stop may consist of a stop plate $X^5$ secured parallel to the nose-piece $A^2$ on the end of a rod $X^6$ which is adjustably carried by the bar X so that the stop plate $X^5$ can be moved towards or away from the nose-piece $A^2$.

The driving arm E is driven at an intermediate point in its length, so as to move in a direction substantially parallel to the length of the pick-up head D, whereby the upper end of the driving arm E is caused to move in a substantially straight line, carrying the pick-up head D with it. The pick-up head D thus traverses the test surface in a substantially straight line, the skid J being constantly urged upwardly into engagement with such test surface by the previously mentioned spring $D^2$ acting on the pick-up head D about the pivotal connection at the upper end of the driving arm E.

The means for driving the driving arm may consist of an electric motor which drives, through reduction gearing $Q^1$ and $Q^2$, a shaft $Q^3$ which at one end carries a buttress thread $Q^4$ (see FIGURE 7). A correspondingly threaded half-nut $Q^5$ engages with such buttress thread $Q^4$ and is spring-urged into cooperation therewith by means of a spring ligament $Q^6$ carried by the driving arm E at an intermediate point in its length, the force exerted by the spring being adequate to hold the half-nut $Q^5$ in driving engagement with the buttress thread $Q^4$ through the whole operative range of movement. In the reverse direction, the pick-up head D can be pushed back to its starting position, the half-nut $Q^5$ riding over the threads of the shaft $Q^3$.

Preferably, however, as shown in FIGURE 1, the driving arm is driven by a crank arm $K^3$ eccentrically pivoted to a crank wheel $K^2$ driven from the electric motor K by means of a driving belt $K^1$. Switches for controlling the motor K and clamping means to be later described may then conveniently be controlled by means of a cam mounted on the crank shaft $K^4$ for the crank wheel $K^2$.

An arrangement for this purpose is shown in FIGURE 8 and conveniently, in this arrangement, the cam L is also used to control a switch $L^1$ for the driving motor K and a switch $L^2$ for a clamp (to be later described) which when operated completes a coupling through which the stylus movements are transmitted to the integrating meter. Movement of the cam L is initiated by means of a lever M operated by a handle (diagrammatically indicated at $M^1$) from outside the casing A. The lever M is pivoted at an intermediate point $M^2$ to the casing A and at its end has a forked portion $M^3$ cooperating with a fixed stop $M^4$ for limiting movement of the lever M in either direction. The lever M carries a latch arm N extending towards the cam L, such arm N, when the lever M is moved from its rest position, engaging with a detent $N^1$ on the cam L so as to cause a small rotation of the cam L sufficient to cause operation of the motor switch $L^1$ in the manner to be described. A spring $N^2$ acts on the lever M through the arm N normally to keep the lever M in its rest position. The cam L cooperates with a roller $L^3$ carried on a switch-operating lever $L^4$ pivoted at $L^5$ to the casing A, the roller $L^3$ being maintained in engagement with the cam L by a spring $L^6$ acting on the lever $L^4$ on the side of the roller $L^3$ remote from the pivot $L^5$. The lever $L^4$ carries two contact-operating elements $L^7$ and $L^8$ respectively for operating the motor switch $L^1$ and the clamp switch $L^2$, and also, on the arms of a forked portion of such lever $L^4$, a pair of aligned contact-operating elements $L^9$ for controlling two pairs of contacts P and $P^1$ for the integrating meter. Each contact of the contact pairs P and $P^1$ is conveniently carried on one end of a spring arm $P^2$ fixed at the other end with respect to the casing A. When the lever M is in its rest position, the contact pair P is closed and the integrating meter is short-circuited.

Thus, in order to perform an indicating or measuring operation, the lever M is rotated by hand through a small angle sufficient to cause the lever $L^4$ to make the small rotation necessary to operate the motor switch $L^1$. The motor then continues the drive, the latch arm N disengaging from the detent $N^1$ so that the lever M can return to its normal rest position. Shortly after the motor K has taken over the drive, the further rotation of the cam L causes the lever $L^4$ to operate the clamp switch $L^2$, thereby completing the coupling through which the movements of the stylus B are transmitted to the meter. After rotation of the cam through about 90°, the lever $L^4$ is rotated sufficiently to have opened the contact pair P and to close the contact pair $P^1$, thereby preparing the integrating circuits for reception of the signals to be received in accordance with the stylus movements. The closing of the contact pair $P^1$ may conveniently cause the meter to be reset to its zero position. After rotation of the cam L through about 225°, the contact pair $P^1$ is opened, whereafter the signal received due to movements of the sylus is integrated. Rotation of the cam L through a further 90° causes closing of the contact pair P, whereby the meter is short-circuited and is thereafter held set at the recorded reading. Further rotation of the cam L opens the clamp switch $L^2$ and then the motor switch $L^1$ just before the cam is restored to its starting position. During the rotation of the cam L, it will be appreciated that the skid J and the stylus B will have been slowly traversed at a uniform speed along a substantially straight-line path on the test surface for the operative measuring stroke and during the remainder of the revolution will have been brought back to the starting position. The cam drive and switching mechanism associated therewith are mounted in the casing A to one side of the driving arm E. When the drive of FIGURE 8 is employed, a switch-controlling cam may be provided on the shaft $Q^3$.

The use of an integrating meter operated in this way, with a single relatively slow traverse of the stylus, to give the desired average roughness reading is much to be preferred, but other forms of measuring or indicating instrument can be used, if desired. Thus, for instance, in one alternative, the stylus is reciprocated over the surface, and a heavily-damped volt-meter is employed to give a reading of the average roughness. It is also possible, if desired, to obtain a trace of the surface roughness, instead of an average reading, by employing a cathode ray oscillograph or a pen recorder as the measuring instrument.

Conveniently, the arrangement described in the present applicant's United States of America patent application Serial No. 742,415 may be used for detecting the working movements of the stylus relatively to the skid approximately normal to the test surface during the traversing movement. This arrangement provides a highly satisfactory coupling to the stylus arm for a relatively "stiff" detector device, such as a piezo-electric crystal, which offers considerable resistance to more than a very small movement. With such a detector device it is desirable to provide a coupling which will accommodate the relatively large movements necessary for initial adjustment to bring the stylus into proper operative engagement with the test surface with the desired contact pressure, whilst at the same time retaining the desired sensitivity of the detector device to the small movements of the stylus during traversing. It will be appreciated that with the above described arrangement for mounting various types of work-piece, sufficient initial movement of the stylus must be allowed to embrace the extreme initial stylus positions encountered firstly when an annulus of small radius is supported on the nose-piece when the test line on its inner surface will be spaced above the top face of the nose-piece, and secondly when a cylinder of small radius is rested in the groove over the slot in the nose-piece when its test line is below the top face of the nose-piece. It is also preferable but not essential that this initial movement should not be accompanied by a build-up of force due to crystal strain owing to the relative stiffness of the crystal.

One arrangement described in the above-mentioned patent application is shown in FIGURES 9, 10 and 11, which show the pick-up head D on an enlarged scale. As has been previously mentioned, such pick-up head D consists of a hollow body pivoted at an intermediate point in its length to the upper end of the driving arm E. The skid supporting arm $J^1$ is mounted on one end of such hollow pick-up head D by means of two securing screws $J^2$. The stylus supporting arm $B^1$, which at one end is secured by means of a screw $C^6$ to the cross-piece C mentioned earlier, is pivoted relatively to the pick-up head D by means of a knife-edge and ligament hinge connection. Thus, the pick-up head D carries two horizontal knife-edges $C^1$ transverse to the length of the pick-up head and each cooperating with the flat underside of one end of the cross-piece C. A pair of spring ligaments $C^2$ are secured at one end to the cross-piece C near the ends thereof but between the two knife-edges $C^1$ substantially in the horizontal plane defined by such knife-edges, such ligaments $C^2$ being secured at their other ends in the same horizontal plane to upward projections $R^1$ from a cross-support R within the pick-up head D. Screws for securing the ligaments $C^2$ in position are indicated at $C^3$. The ligaments $C^2$ act to minimise slip at such knife-edges $C^1$. In order to keep the cross-piece C in engagement with the knife-edges $C^1$, a spring $C^4$ acts to urge the cross-piece downwardly, the anchorage $C^5$ for such spring $C^4$ being mounted in the pick-up head D so as to be adjustable in the direction of the length of the pick-up head D. In this way, the position of the anchorage $C^5$ can be adjusted so that the stylus B is lightly urged upwardly with respect to the pick-up head D and the skid J with the required stylus pressure. The cross-piece C, between the ligaments $C^2$, carries a detector device constituted by a piezo-electric element S which extends away from the cross-piece C in the opposite direction to the stylus supporting arm $B^1$ and passes between the upward projections $R^1$ from the cross-support R. An adjustable stop $R^2$ projects upwardly from the cross-support R within the pick-up head D to engage the detector element S at an intermediate point in the length thereof. The detector element S rests on the stop $R^2$ and thus the level of such stop $R^2$ determines the initial or nominal projection of the tip of the stylus B beyond the tip of the skid J. The detector element S is electrically connected through an amplifier to an indicating device (which may for example be constituted by the meter previously mentioned) by means of which the variations in the electric potential difference developed across such piezo-electric element as its flexure changes can be measured.

The end of the detector element S remote from the cross-piece C, beyond the projections $R^1$ from the pick-up head D, carries a small plate-like armature T of magnetisable material lying in a horizontal plane. Adjacent thereto, the pick-up head D carries clamping means which, when operated (for example by means of the cam-operated switch previously described) fixedly locate a line through the plate-like armature T parallel to the axis of the pivot for the cross-piece C carrying the stylus B and the detector element S. As shown in FIGURES 5, 6 and 7, such clamping means comprises a pair of magnetisable cores $T^2$ which are clamped in grooves in the underside of the cross-support R carried by the pick-up head D by means of a magnetisable clamping plate $T^3$ held by a clamping screw $T^4$. Each core $T^2$ also constitutes a shaft on which pivots a clamping arm $T^5$ of magnetisable material which extends upwardly from the shaft $T^2$ to one side of the plate-like armature T. The magnetic circuit through the cores $T^2$, the clamping plate $T^3$, the clamping arms $T^5$, the armature T and the air gaps on each side thereof, is energised by current through coils $T^1$ carried on bobbins $T^6$. When such coils $T^1$ are energised, the clamping arms $T^5$, pivoted on their supporting shafts $T^2$, are drawn towards each other, thereby gripping the armature T between them substantially along a single line. Stops $T^7$ (for clarity omitted in FIGURE 6 but shown in FIGURE 7) are provided to limit the gap between the clamping arms $T^5$ and the armature T when the coils $T^1$ are not energised. If desired, weak return springs (not shown) may be used for returning the clamping arms $T^5$ to their rest positions when the coils $T^1$ are deenergised.

It will be appreciated that, when the clamping means is operated, the position of the armature T relative to the pick-up head D is held fixed, and the stylus support $B^1$ and the detector element S carried by the cross-piece C are no longer able to pivot relatively to the pick-up head D without flexing the detector element S.

The operation of the apparatus, and in particular, the pick-up unit, will now be described, assuming a body carrying the test surface to have been placed on the projecting nose-piece support $A^2$ in one of the above-mentioned ways. As above mentioned, the skid J carried by the pick-up head D is lightly urged by the spring $D^2$ previously mentioned into contact with the test surface. The biassing spring $C^4$ on the cross-piece C will have been adjusted so that the stylus B is pressed against the test surface with the requisite light force, and the adjustable stop $R^2$ will have been adjusted so that the stylus B initially projects beyond the skid J to the required extent. The driving means is then started up and the clamping means operated, for example by means of the switch $L^2$ controlled by the cam-operated lever described with reference to FIGURE 3, the clamping means thereafter acting so as fixedly to locate one end of the detector element S relatively to the pick-up head D. The stylus B is still held in engagement with the test surface by the action of the biassing spring C⁴ and, at the time of operation of the clamping means, the detector element S will be unstressed. The driving means causes the pick-up head D to be traversed in a substantially straight line along the test surface, and during such traversing movement, the stylus B moves up and down in a direction approximately normal to the test surface and relatively to the pick-up head D in accordance with the roughnesses of the surface, such working movements causing flexure of the piezo-electric element to a varying extent, in one direction or the other in accordance with the movement of the stylus relatively to the position it occupied at the moment of clamping, whereby such element supplies a varying electrical output which is utilised to operate the measuring or indicating instrument.

The mounting of the stylus and the detector on the pick-up head is only one of several mounting arrangements described in the above-mentioned copending application, and the particular mounting arrangement above described may be replaced by any of the other arrangements described in such copending application if desired.

The apparatus may also be modified in other ways. Thus, the detector device may not be constituted by a crystal or other relatively stiff device, but may comprise any convenient transducer capable of generating or modulating a voltage or current when one part of it is subjected to movement. Again, the mounting of the pick-up head on the driving arm, and the means for driving such arm, may be replaced by other mechanism capable of driving the pick-up head in the desired path, which path may be straight or arcuate or have such other form as may be desired. For example, the skid, instead of engaging the work surface, may be directed downwards to engage a flat or a shaped reference surface. Alternatively, a socket on the under-side of the skid arm may engage one end of a ball-ended radius guide bar, the other end of which engages in a socket carried on the casing.

It should also be made clear that although for convenience the projecting work support has been described as projecting horizontally outwards above one edge of the casing, the casing may be mounted in the inverted position or in any other desired position, the elements of the pick-up being balanced to permit operation in such other positions. Again, the nose-piece need not be slotted, the stylus projecting upwardly by the side of the nose-piece into engagement with the test surface.

The amplifier and the measuring instruments or meters are preferably housed in a casing separate from the above-described casing A carrying the work support, such two casings being connected together by a flexible electric cable or cables for electrically connecting the detecting means to the amplifier and when necessary also for electrically connecting the cam-controlled switches to the integrating meter. The use of such two casings interconnected by a flexible cable or cables facilitates movement of the casing A carrying the work support so that the apparatus may be used if desired by applying the nose-piece A² to the test surface instead of supporting the test body on the nose-piece. For this purpose, for example, the casing A carrying the work support may be carried by a movable bracket or an extensible arm mounted on any suitable supporting framework.

What I claim as my invention and desire to secure by Letters Patent is:

1. Apparatus for measuring or indicating the roughnesses or undulations of a surface, comprising a box-like casing including among its walls a first wall and an apertured second wall at least approximately perpendicular to the first wall, a pick-up head projecting through the apertured wall in a direction approximately parallel to the first wall, a movable pick-up support within the casing to which the pick-up head is connected, a stylus supporting arm connected to the pick-up head and projecting through the apertured wall in a direction generally parallel to such pick-up head, an elongated work support slotted along its length and carried by the casing in continuation of the first wall to project beyond the apertured wall in a direction approximately parallel to the pick-up head and to the stylus supporting arm, a stylus extending laterally from the projecting portion of the stylus supporting arm towards the slotted work support, a rounded skid extending laterally from the projecting portion of the pick-up head towards the slotted work support, means for biasing the pick-up head relatively to the pick-up support to urge the rounded skid through the slotted work support into engagement with the test surface, means for biassing the stylus supporting arm relatively to the pick-up head to urge the stylus through the slotted work support into engagement with the test surface, means within the casing for moving the pick-up support to apply a lengthwise traversing movement to the pick-up head and thereby to apply to the skid and stylus a traversing drive parallel to the length of the slot in the work support to cause such skid and stylus to traverse the work surface, and detecting means within the casing responsive to the working movements of the stylus approximately normal to the test surface during traversing for operating a measuring or indicating instrument, the skid affording a reference datum for such working movements.

2. Measuring or indicating apparatus as claimed in claim 1 in which at least part of the first wall of the box-like casing is constituted by a plate like member having an elongated slotted extension constituting the slotted work support, such plate like member being itself slotted in continuation of the slot in the work support to afford an additional receiving surface for supporting a workpiece.

3. Measuring or indicating apparatus as claimed in claim 1 including a fence carried by the casing and extending parallel to the direction of traversing to provide a lateral abutment for a workpiece located on the work support, and means for permitting movement of the fence in a direction at right angles to direction of traversing in order to adjust its position.

4. Apparatus as claimed in claim 1, in which the means for traversing the stylus comprises a bearing member carrying a rounded bearing surface, at least one guide determining a guide plane parallel to a straight line path in which it is desired to move the pick-up head, means for urging the rounded bearing surface towards the guide, means for effectively pivoting the pick-up head to the bearing member at a distance from the guide plane equal or approximately equal to the radius of curvature of the rounded surface on the bearing member, and means for moving the bearing member so that it is caused to roll along the guide plane in the desired direction of movement of the pick-up head.

5. Apparatus as claimed in claim 1, in which the detecting means is constituted by a detector device and at least one of two normally operative connection respectively between the stylus supporting arm and the detector device and between the detector device and the pick-up head includes a yieldable coupling for rendering the detector device unresponsive to the working movements of the stylus, and including clamping means which can be operated to make the yieldable coupling operative and thereby to render the detector device responsive to the working movements of the stylus during the traversing movement.

6. Measuring or indicating apparatus as claimed in claim 5, in which the yieldable or breakable coupling includes a member which when the coupling is unclamped is free to move about a pivot axis parallel to the test surface, and the clamping means comprises a pair of jaws which when operated exert a gripping force on such member in a direction parallel to such pivot axis.

7. Measuring or indicating apparatus as claimed in claim 6, in which the two clamping jaws and the member gripped between them are made of magnetisable material and form part of a magnetic circuit linked with an operating coil or coils whereby energisation of such coil or coils will cause the two jaws to move into gripping engagement with the member.

References Cited in the file of this patent

UNITED STATES PATENTS

| | | |
|---|---|---|
| 1,890,923 | Wilson | Dec. 13, 1932 |
| 2,171,433 | Powers | Aug. 29, 1939 |
| 2,344,217 | Reason | Mar. 14, 1944 |
| 2,372,451 | Reason | Mar. 27, 1945 |
| 2,471,009 | Reason | May 24, 1949 |

FOREIGN PATENTS

| | | |
|---|---|---|
| 655,766 | Great Britain | Aug. 1, 1951 |